United States Patent
Kim et al.

(10) Patent No.: US 11,557,938 B2
(45) Date of Patent: Jan. 17, 2023

(54) MOTOR UNIT FOR SUNROOF

(71) Applicant: KEYANG ELECTRIC MACHINERY CO., LTD., Seoul (KR)

(72) Inventors: Seong Soo Kim, Osan-si (KR); Seung Tae Yun, Ansan-si (KR); Jin Seok Lee, Ansan-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 161 days.

(21) Appl. No.: 17/231,475

(22) Filed: Apr. 15, 2021

(65) Prior Publication Data

US 2021/0367480 A1    Nov. 25, 2021

(30) Foreign Application Priority Data

May 25, 2020  (KR) .................. 10-2020-0062139

(51) Int. Cl.
| | |
|---|---|
| *H02K 7/11* | (2006.01) |
| *B60J 7/05* | (2006.01) |
| *H02K 7/116* | (2006.01) |
| *B60J 7/057* | (2006.01) |

(52) U.S. Cl.
CPC .......... *H02K 7/1166* (2013.01); *B60J 7/0573* (2013.01)

(58) Field of Classification Search
CPC .. H02K 5/00; H02K 5/22; H02K 7/10; H02K 7/11; H02K 7/116; B60J 7/00; B60J 7/04; B60J 7/043; B60J 7/05; B60J 7/057
See application file for complete search history.

(56) References Cited

U.S. PATENT DOCUMENTS

| | | | | |
|---|---|---|---|---|
| 10,876,595 | B2* | 12/2020 | Sugiyama | .............. H02K 7/116 |
| 2011/0133584 | A1* | 6/2011 | Uchimura | ............. E05F 15/697 |
| | | | | 310/83 |
| 2013/0167680 | A1 | 7/2013 | Lam et al. | |
| 2020/0014264 | A1* | 1/2020 | Bourqui | ............... H02K 1/2726 |

FOREIGN PATENT DOCUMENTS

| | | |
|---|---|---|
| JP | 2011-174577 A | 9/2011 |
| KR | 10-0596557 B1 | 7/2006 |
| KR | 20-0428305 Y1 | 10/2006 |
| KR | 10-0729408 B1 | 6/2007 |
| KR | 10-2013-0079266 A | 7/2013 |
| KR | 10-2015-0072227 A | 6/2015 |
| KR | 10-2019-0003073 A | 1/2019 |

\* cited by examiner

*Primary Examiner* — Tran N Nguyen
(74) *Attorney, Agent, or Firm* — Novick, Kim & Lee PLLC; Jae Youn Kim

(57) ABSTRACT

A motor unit for a sunroof is proposed. The motor unit may include a lower housing, an upper housing, a bush, a worm wheel, a drive shaft, a pinion gear, the washer, and a bottom cover. Particularly, contact between the drive shaft and the bottom cover may be prevented, and the worm wheel may be configured to be in contact with the washer and he bush. Accordingly, different kinds of noise may be prevented from being generated according to opening and closing directions of the sunroof.

9 Claims, 11 Drawing Sheets

MOTOR UNIT FOR SUNROOF

CROSS REFERENCE TO RELATED APPLICATION

The present application claims priority to Korean Patent Application No. 10-2020-0062139, filed May 25, 2020, the entire contents of which is incorporated herein for all purposes by this reference.

BACKGROUND OF THE INVENTION

Field of the Invention

The present disclosure relates to a new type of a motor unit for a sunroof, in which during the opening and closing of a sunroof, different kinds of noises are prevented from occurring according to directions of the opening and closing, and adjustment of intervals between a worm wheel and a bush and between a pinion gear and the bush is easily performed, and the intervals are constantly maintained for a long period of time.

Description of the Related Art

Generally, a sunroof is a structure configured to open and close an opening part provided on a ceiling of a vehicle, and is configured by including sunroof glass and a motor unit for a sunroof. Such a sunroof is configured to open or close the opening part on the ceiling of a vehicle while the sunroof glass is moved forward or backward along rails at opposite sides of the opening part by the clockwise/counterclockwise driving of the motor unit for a sunroof according to the needs of a user.

The motor unit for a sunroof is a driving source which automatically operates the sunroof glass. Such a motor unit for a sunroof is disclosed in Korean Utility Model Registration No. 20-0428305 (Patent Document 1), Korean Patent Application Publication No. 10-2015-0072227 (Patent Document 2), and Korean Patent Application Publication No. 10-2019-0003073 (Patent Document 3).

The motor unit for a sunroof according to each of the prior arts described above is configured such that a pinion gear is rotated by driving a worm and a worm wheel by the driving force of a drive motor, and a wire for operating the sunroof glass (hereinbelow, referred to as an operation wire) connected to the pinion gear is operated.

Particularly, the worm wheel and the pinion gear are connected to each other such that power is transmitted between the worm wheel and the pinion gear by a drive shaft.

That is, the worm wheel is integrated with the circumference of a lower end part of the drive shaft by injection molding, and is configured to operate the drive shaft by receiving the driving force of the worm. The pinion gear is press-fitted over and coupled to an upper end part of the drive shaft and is configured to rotate with the drive shaft.

In this case, the worm and the worm wheel are provided in installation space provided between an upper housing and a bottom cover so as to be protected from an external environment, and the pinion gear is configured to be connected to the operation wire by being exposed to an upper side of the upper housing.

Meanwhile, in the conventional motor unit for a sunroof having the above mentioned configuration, according to an interval between the upper housing and the pinion gear (more specifically, an interval between the bush in the upper housing and the pinion gear), an operation performance of the conventional motor unit for opening and closing the sunroof glass changes.

That is, as the pinion gear is located away from the bush of the upper housing, shaking of the drive shaft occurs, so the operation performance of the operation wire deteriorates. When the pinion gear is in contact with the upper housing, due to friction therebetween, the pinion gear wears and the operation performance thereof deteriorates.

Accordingly, in the conventional motor unit, the bottom cover is configured to support the lower end of the drive shaft, and the worm wheel is configured to be in contact with the lower surface of the bush, so the pinion gear is spaced apart from the bush while continuously maintaining a predetermined interval therefrom.

However, in a structure according to such a conventional technology, when the drive shaft rotates clockwise, the worm wheel and the bush operate in contact with each other, and when the drive shaft rotates counterclockwise, the drive shaft and the bottom cover operate in contact with each other, so contact noises different from each other occur according to the rotating directions of the drive shaft.

That is, the bush is made of metal, and the worm wheel is made of a mold material, so contact noise therebetween occurs as friction noise between the metal and resin. However, the drive shaft and the bottom cover are both made of metal, so contact noise therebetween occurs as friction noise between the metals. Accordingly, noises different from each other are generated according to the operation of the sunroof, which affects a user's mood.

Of course, the bottom cover may be formed of a mold material instead of metal. However, since the bottom cover is required to continuously support the drive shaft with a predetermined pressure, in a case in which the bottom cover is made of the mold material instead of the metal, the bottom cover suffers from continuous wear and is damaged during long use of the bottom cover, so continuous maintenance thereof is required to be performed. Accordingly, it is impossible to exchange the metal material with the mold material.

In addition, according to the conventional technology described above, an interval between the worm wheel and the bush and an interval between the pinion gear and the bush are adjusted by the bottom cover, so the bottom cover is required to be tightly coupled to the upper housing, and predetermined coupling force is required to be supplied thereto.

DOCUMENTS OF RELATED ART (Patent Document 1) Korean Utility Model Registration No. 20-0428305
(Patent Document 2) Korean Patent Application Publication No. 10-2015-0072227
(Patent Document 3) Korean Patent Application Publication No. 10-2019-0003073

SUMMARY OF THE INVENTION

Accordingly, the present disclosure has been made keeping in mind the above problems occurring in the related art, and the present disclosure is intended to propose a motor unit for a sunroof, in which irrespective of the opening/closing direction of the sunroof, the same kind of contact noise may be generated to improve emotional quality.

In addition, the present disclosure is intended to propose a motor unit for a sunroof, in which adjustment of intervals between a worm wheel and a bush and between a pinion gear and the bush may be easily performed and the intervals may be constantly maintained for a long period of time.

In order to achieve the above objectives, according to one aspect of the present disclosure, there is provided a motor unit for a sunroof, the motor unit including: an upper housing constituting an upper body of the motor unit and configured as a box body having an open lower surface, the upper housing having a protruding hub formed at a center portion thereof; a bush provided in the protruding hub of the upper housing; a worm wheel having a hub part formed at a center thereof by protruding therefrom such that the hub part is rotatably installed by passing through an inside of the bush, and having a circumference configured to be engaged with a worm gear; a drive shaft installed to be fixed to the worm wheel by passing through the hub part of the worm wheel; a pinion gear coupled to an upper end part of the drive shaft such that power is transmitted therebetween; a washer located between the pinion gear and the hub part of the worm wheel; and a bottom cover covering and blocking the open lower surface of the upper housing, wherein a bent part is formed at an upper end of the drive shaft, the bent part covering a portion of an upper surface of the pinion gear, and a contact part is formed at an upper surface of the worm wheel, the contact part configured to be in contact with a lower surface of the bush.

Here, the bent part of the drive shaft may be formed through riveting after the pinion gear is coupled to the drive shaft.

In addition, the bush may be made of metal, and the worm wheel may be made of resin.

Furthermore, the washer may be configured to be in contact with an upper surface of the hub part of the worm wheel.

Additionally, a receiving part may be formed in the bottom cover such that the hub part of the worm wheel is received in the receiving part, and a through hole may be formed in the receiving part such that the drive shaft passes through the through hole.

In addition, when the drive shaft fixed to the worm wheel moves upward, the contact part may be located to be in contact with the bush.

Furthermore, when the drive shaft fixed to the worm wheel moves maximally upward, the contact part may be located to be in contact with the bush.

In addition, the lower end of the bush may be configured to bend toward the upper housing.

Additionally, the washer may be configured to cover the upper surface of the hub part of the worm wheel and the upper surface of the bush.

As described above, in the motor unit for a sunroof according to the present disclosure, the same noise may be generated irrespective of clockwise/counterclockwise rotation of the pinion gear, thereby preventing complaints of a user caused by different contact noises occurring during the opening and closing of the sunroof glass.

In addition, in the motor unit for a sunroof according to the present disclosure, the pinion gear may be maintained to be in continuous contact with the washer, thereby enabling the drive shaft to continuously and efficiently operate without being shaken horizontally by force applied to the pinion gear.

Furthermore, in the motor unit for a sunroof according to the present disclosure, the bottom cover may not be a structure supporting the drive shaft, and the drive shaft may be configured to be pulled to the upper surface of the pinion gear by riveting such that there is no interval between each component, thereby making a design for preventing the downward bending of the bottom cover unnecessary. Particularly, the bottom cover may be formed of a resin material, thereby facilitating the manufacturing and assembly of the motor unit for a sunroof.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, an exemplary embodiment of a motor unit for a sunroof according to the present disclosure will be described with reference to FIGS. 1 to 13.

Figure 1:
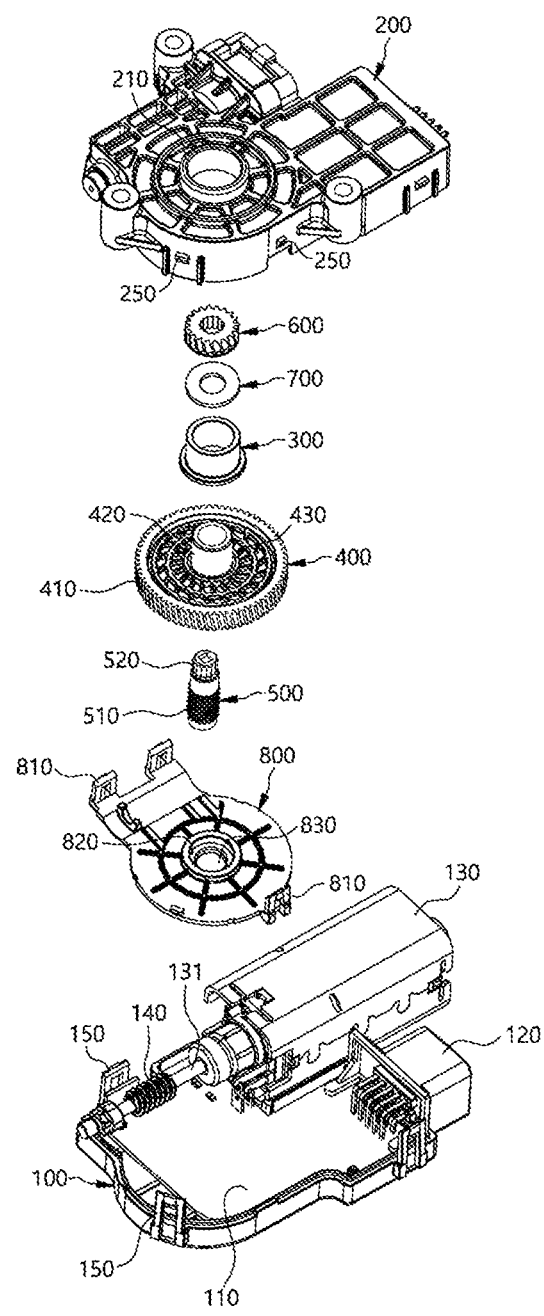
FIG. 1 is an exploded perspective view illustrating a motor unit for a sunroof according to an embodiment of the present disclosure.
Figure 2:
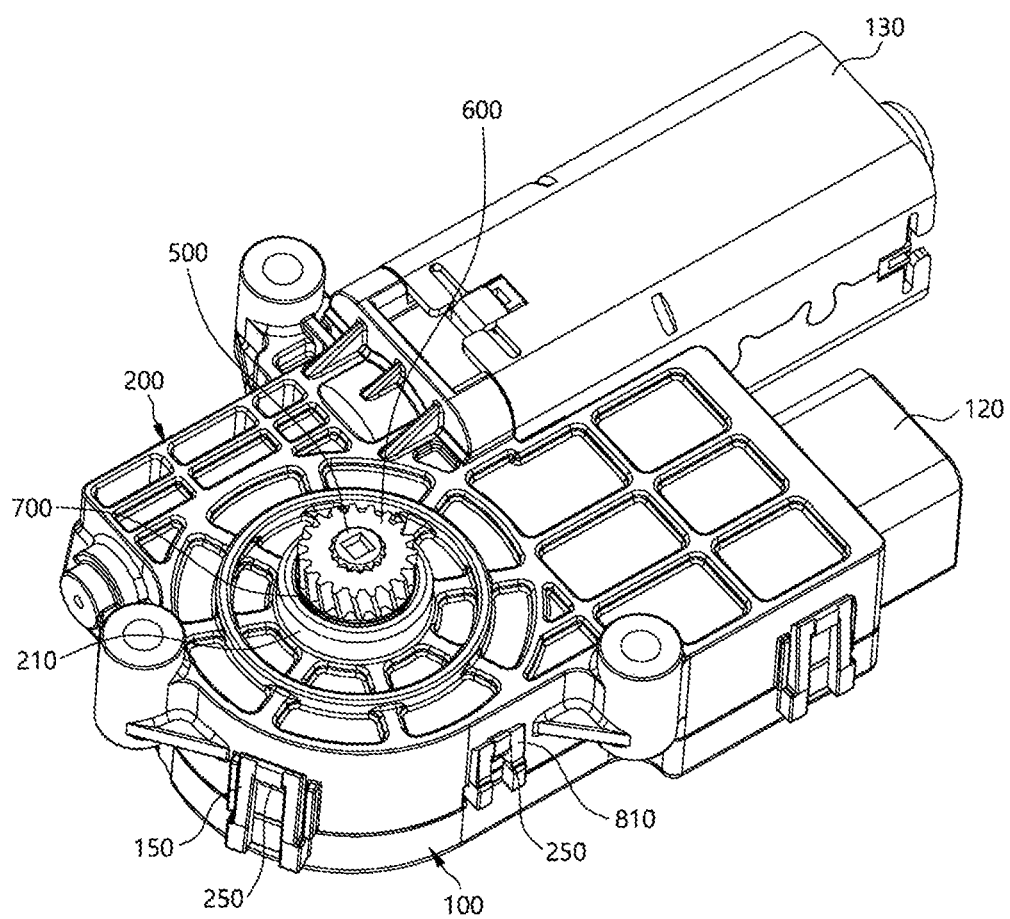
FIG. 2 is a perspective view illustrating the exterior structure of the motor unit for a sunroof according to the embodiment of the present disclosure.
Figure 3:
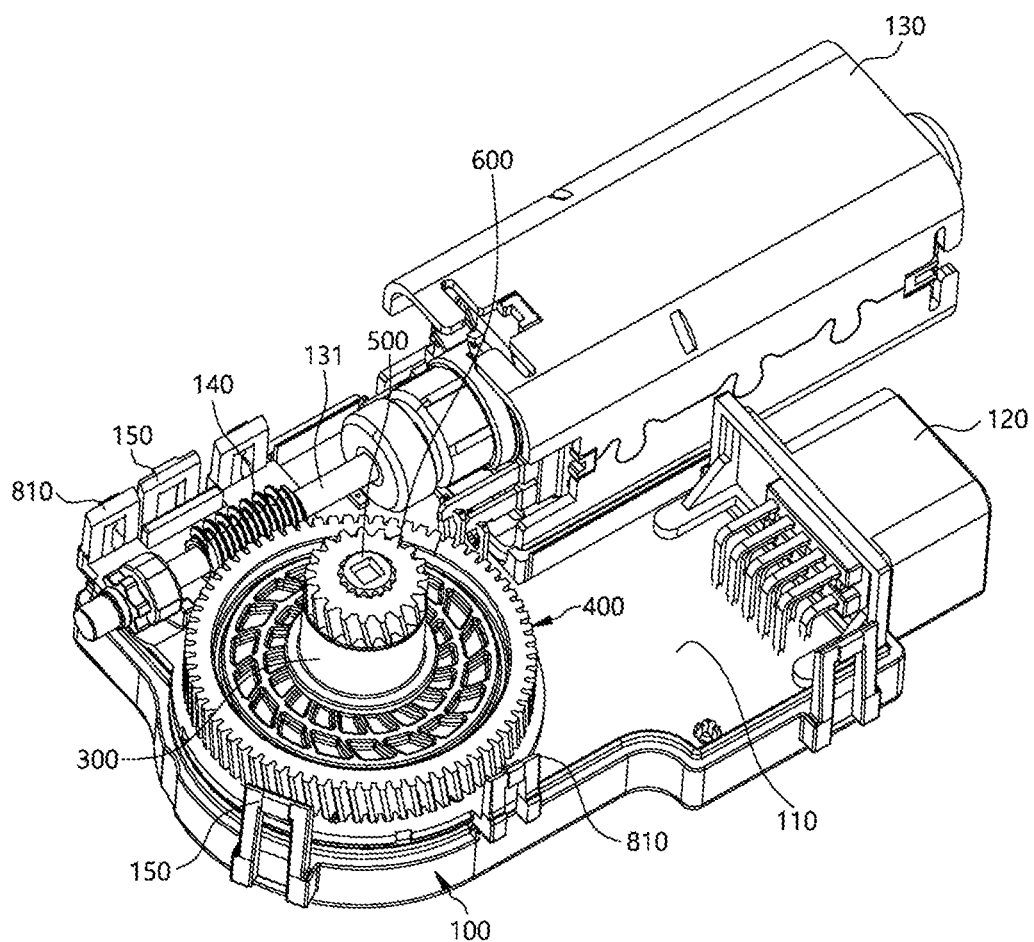
FIG. 3 is a perspective view illustrating a structure of the motor unit for a sunroof from which an upper housing is removed according to the embodiment of the present disclosure.
Figure 4:
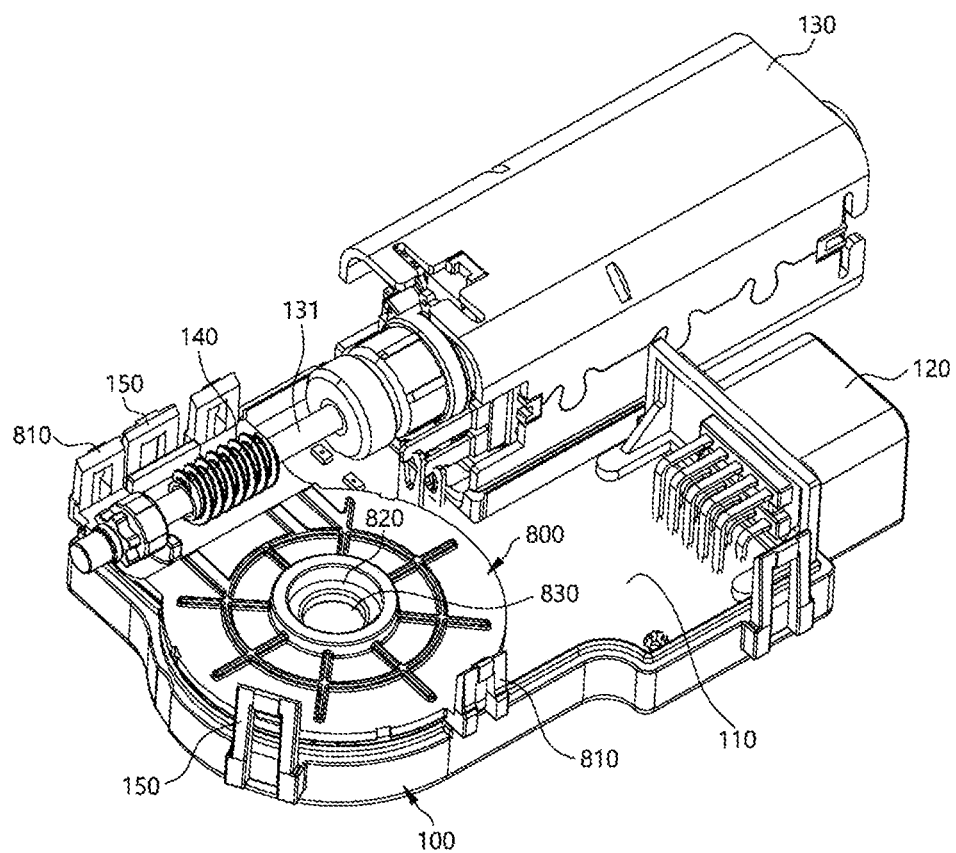
FIG. 4 is a perspective view illustrating a state in which a bottom cover is mounted to a lower housing in the motor unit for a sunroof according to the embodiment of the present disclosure.

FIG. 1 is an exploded perspective view illustrating a motor unit for a sunroof according to an embodiment of the present disclosure; FIG. 2 is a perspective view illustrating the exterior structure of the motor unit for a sunroof according to the embodiment of the present disclosure; FIG. 3 is a perspective view illustrating a structure of the motor unit for a sunroof from which an upper housing is removed according to the embodiment of the present disclosure; and FIG. 4 is a perspective view illustrating a state in which a bottom cover is mounted to a lower housing in the motor unit for a sunroof according to the embodiment of the present disclosure.

Figure 5:
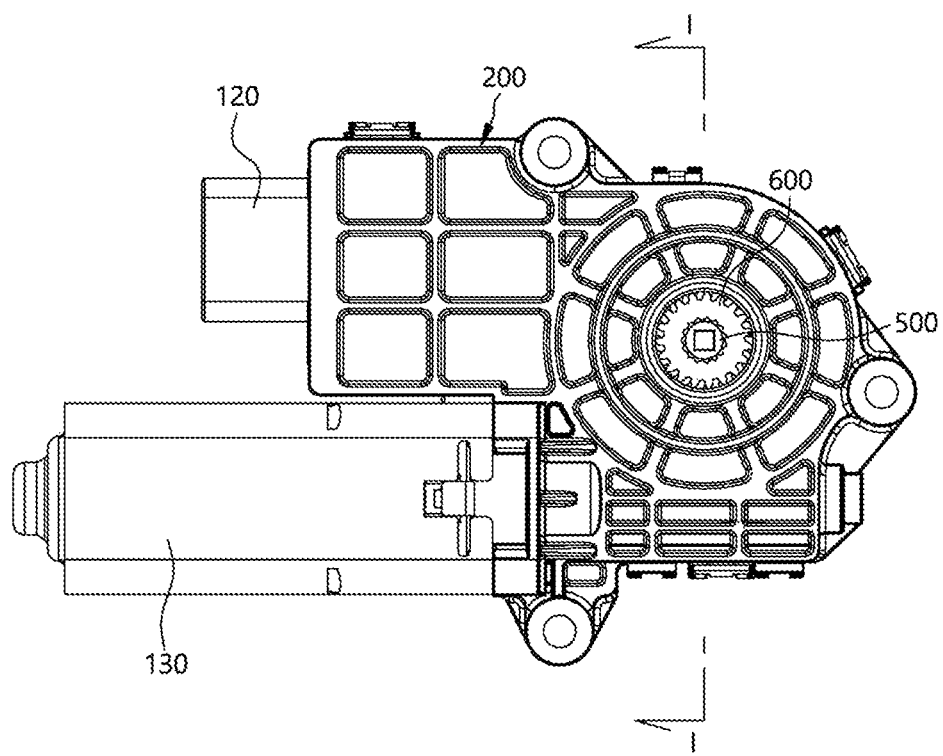
FIG. 5 is a top plan view illustrating the motor unit for a sunroof according to the embodiment of the present disclosure.
Figure 6:
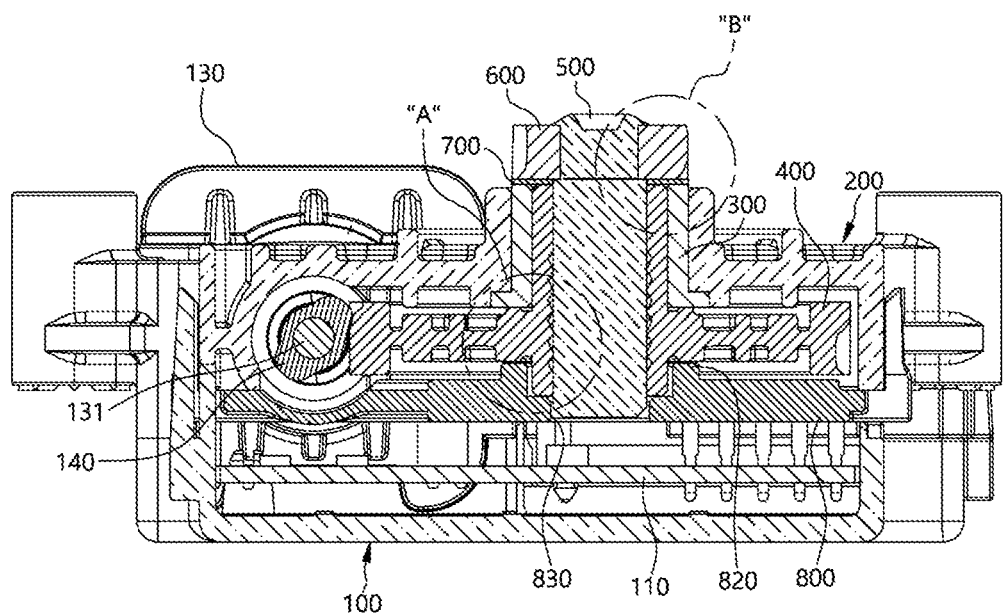
FIG. 6 is a sectional view taken along line I-I of FIG. 5.
Figure 7:
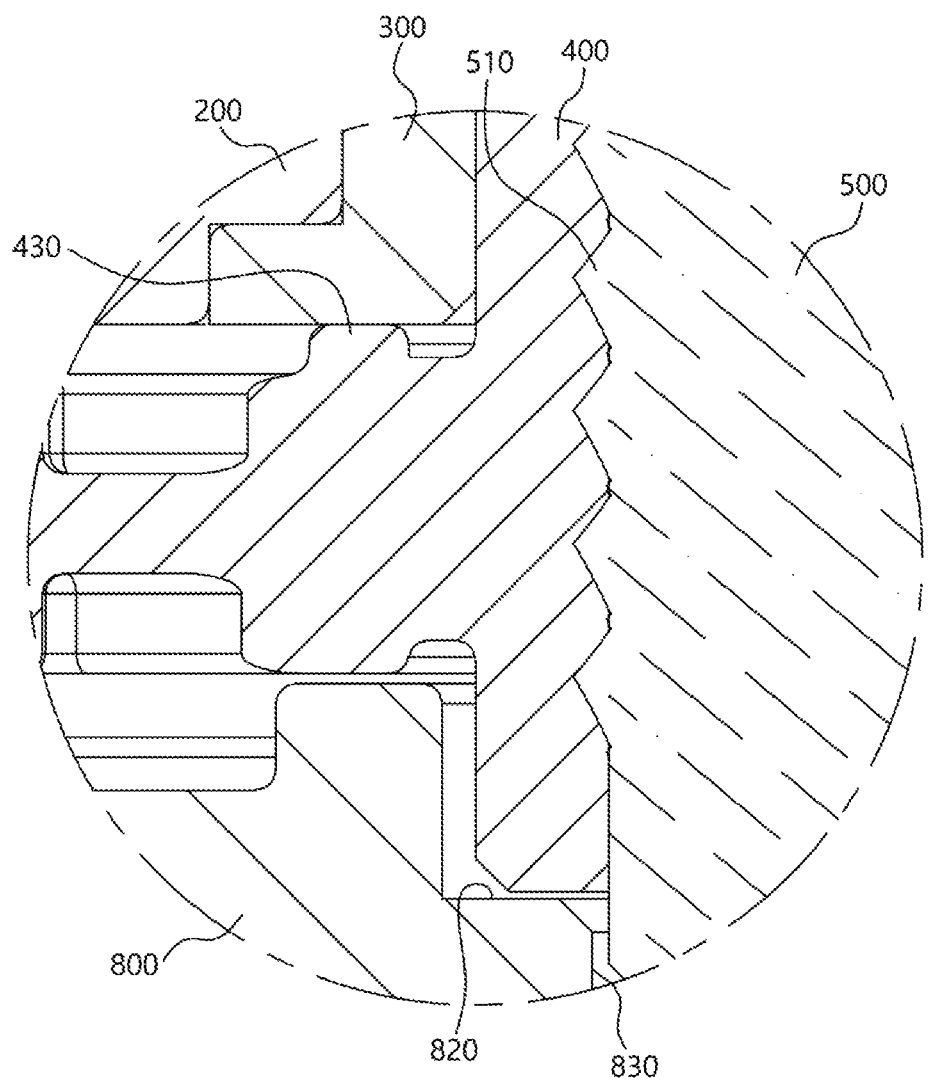
FIG. 7 is an enlarged view of an "A" part of FIG. 6.
Figure 8:
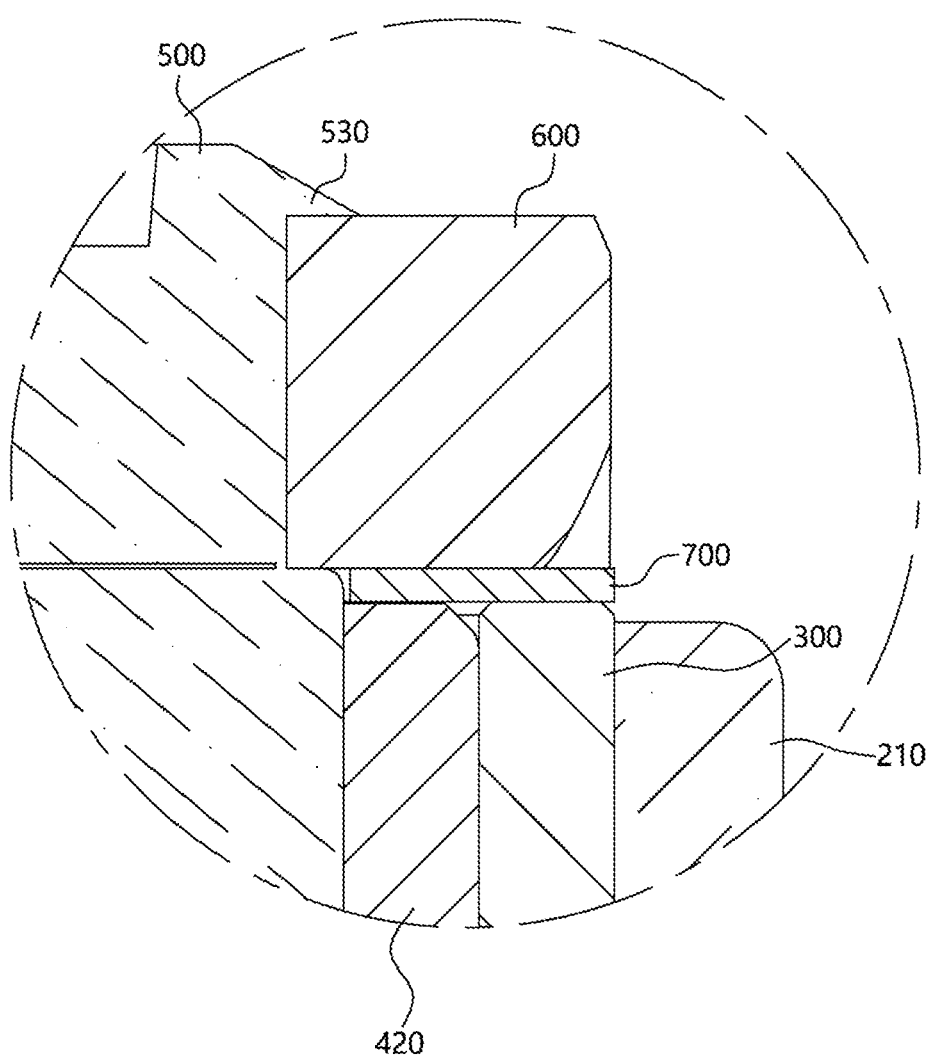
FIG. 8 is an enlarged view of a "B" part of FIG. 6.

In addition, FIG. 5 is a top plan view illustrating the motor unit for a sunroof according to the embodiment of the present disclosure, and FIG. 6 is a sectional view illustrated to describe the inner structure of the motor unit for a sunroof according to the embodiment of the present disclosure.

As illustrated in these drawings, the motor unit for a sunroof according to the embodiment of the present disclosure may be configured by largely including a lower housing 100, an upper housing 200, a bush 300, a worm wheel 400, a drive shaft 500, a pinion gear 600, a washer 700, and a bottom cover 800. Particularly, contact between the drive shaft 500 and the bottom cover 800 may be prevented and the worm wheel 400 may be configured to be in contact with the washer 700 and the bush 300 such that friction noise between metals is prevented from being generated, and no spacing distance may exist between the pinion gear 600 and the washer 700, between the washer 700 and the bush 300, and between the bush 300 and the worm wheel 400, so the change of contact portion between each component and the generation of different noises due to the spacing distance may be prevented.

Hereinafter, this will be described further in detail for each component.

First, the lower housing 100 may be a part constituting a lower body of the motor unit for a sunroof.

Such lower housing 100 may be configured as a box body having a closed bottom part and an open upper surface, and a printed circuit board 110 may be provided inside the lower housing 100.

In addition, a connector 120 may be provided at a portion of the lower housing 100 such that the connector 120 is connected to an external power supply, and a drive motor 130 may be provided at another portion of the lower housing 100 such that the drive motor is driven by receiving power.

In this case, the drive motor 130 may be configured as a brushless DC motor that can rotate clockwise and counter-clockwise.

In addition, a worm gear 140 may be provided on a motor shaft 131 rotated by receiving driving force of the drive motor 130.

Next, the upper housing 200 may be a part constituting an upper body of the motor unit for a sunroof.

Such an upper housing 200 may be configured as a box body having an open lower surface and to cover the open upper surface of the lower housing 100.

In addition, a protruding hub 210 may be formed at a center portion of the upper housing 200. In this case, the protruding hub 210 may be formed as a tubular body open vertically.

Additionally, the upper housing 200 and the lower housing 100 may be configured to be coupled to each other by a hook structure. For example, a plurality of hooks 250 may be formed on a surface of an outer boundary of the upper housing 200, and a plurality of hook holders 150 may be formed on a surface of an outer boundary of the lower housing 100 such that the upper housing 200 and the lower housing 100 may be easily coupled to or removed from each other.

Next, the bush 300 may be a part provided to support the rotation of the worm wheel 400 to be described later.

Such a bush 300 may be made of metal to have a pipe shape and may be fixed to the inside of the protruding hub 210 of the upper housing 200.

In this case, the lower end of the bush 300 may be formed to bend outward, so the bush 300 may be provided from excessively protruding upward from the protruding hub 210.

Of course, the bush 300 may be configured to be integrated with the upper housing 200 by being inserted thereto during the injection molding of the upper housing 200.

Next, the worm wheel 400 may be a component rotated by receiving the driving force from the drive motor 130.

Such a worm wheel 400 may be made of synthetic resin for molding which can be injection molded, and may be installed in a direction perpendicular to the drive motor 130, and a gear part 410 may be formed on an outer circumferential surface of the worm wheel 400 such that the gear part 410 is rotated in engagement with the worm gear 140.

In addition, a hub part 420 may be formed at the center of the worm wheel 400 by protruding therefrom, and may be rotatably installed by passing through the inside of the bush 300.

Furthermore, a contact part 430 may be formed on the upper surface of the worm wheel 400. The contact part 430 may be a part protruding from the upper surface of the worm wheel 400 such that the contact part 430 is in contact with the lower surface of the bush 300. When the drive shaft 500 fixed to the worm wheel 400 moves maximally upward, the contact part 430 may be located to be in contact with the bush 300.

Next, the drive shaft 500 may be a part transmitting the driving force of the worm wheel 400 to the pinion gear 600 to be described later.

Such a drive shaft 500 may be formed as a metal shaft, and may be configured to be fixed to the worm wheel 400 by passing through the hub part 420 of the worm wheel 400.

The drive shaft 500 may be configured to be integrated with the hub part 420 through insert injection. To this end, a knurling part 510 may be formed on the circumferential surface of the drive shaft 500 to increase a contact area between the drive shaft 500 and the hub part 420 and to maintain a stable fixed state to each other.

In addition, a serration part 520 having a plurality of ridges and grooves formed alternately thereon may be formed at the top of the drive shaft 500.

Next, the pinion gear 600 may be connected to a wire for operating the sunroof glass (hereinbelow, referred to as an operation wire) (not shown) installed to operate the sunroof glass and may be a part manipulating the operation wire.

Such a pinion gear 600 may be formed as a metal gear, and may be installed to be coupled to the serration part 520 formed at the top of the drive shaft 500 such that the pinion gear 600 receives power from the drive shaft 500.

In this case, ridges and grooves corresponding to the ridges and grooves of the serration part 520 may be formed in the inner circumferential surface of the pinion gear 600 such that the pinion gear 600 is engaged with the serration part 520.

Next, the washer 700 may be a part provided to support the rotation of the pinion gear 600.

Such a washer 700 may be formed of the same metal material as the material of the pinion gear 600 and may be formed of the same resin material as the material of the worm wheel 400.

In addition, the washer 700 may be located between the lower surface of the pinion gear 600 and the upper surfaces of the hub part 420 and the bush 300, and may be configured to be in contact with the hub part 420 by being placed thereon. In this case, the washer 700 may be configured to cover the upper surfaces of the hub part 420 and the bush 300.

That is, due to the provision of the washer 700, wear of the pinion gear 600 caused by direct contact of the pinion gear 600 with the bush 300 or the worm wheel 400 may be prevented. In addition, during the riveting of the drive shaft 500, the drive shaft 500 may not be pulled excessively but may be pulled such that there is no interval between the lower surface of the bush 300 and the worm wheel 400, so the malfunction of the rotation of the pinion gear 600 may be prevented.

The upper surface of the hub part 420 and the upper surface of the bush 300 may be configured to have the same heights, so the washer 700 may be simultaneously in contact with the upper surfaces of the hub part 420 and the bush 300.

Of course, the upper surface of the hub part 420 may be configured to be higher than the upper surface of the bush 300, so the washer 700 may be in contact with only the upper surface of the hub part 420. Alternatively, the upper surface of the bush 300 may be configured to be higher than the upper surface of the hub part 420, so the washer 700 may be in contact with only the upper surface of the bush 300.

Meanwhile, a bent part 530 may be formed at an upper end of the drive shaft 500, the bent part 530 covering a portion of an upper surface of the pinion gear 600 to be described later.

In this case, the bent part 530 may be formed through the riveting. That is, while the drive shaft 500 is moved maximally upward by the riveting, a portion of the upper surface of the drive shaft 500 may be bent to cover the upper surface of the pinion gear 600.

Particularly, when coupling the pinion gear 600 to the drive shaft 500 through the riveting, the pinion gear 600 may be in contact with the washer 700 and the rotation of the pinion gear 600 may be difficult. However, since the washer 700 may be made of metal, the washer 700 may only be in contact with the upper surface of the bush 300 during the riveting and may not be transformed by being pressed thereby. Accordingly, despite the riveting, the washer 700 may efficiently rotate, and thus the pinion gear 600 placed on the washer 700 may also rotate efficiently.

Next, the bottom cover 800 may be a part on which the worm wheel 400 is installed to sit and rotate.

Such a bottom cover 800 may be installed to block a bottom of the worm wheel 400.

A plurality of hook holders 810 may be formed on an outer boundary of the bottom cover 800, and the plurality of hooks 250 may be formed on the outer boundary of the upper housing 200 such that the hooks 250 may be detachably engaged with the hook holders 810, respectively.

In the case of the bottom cover 800 provided in the conventional motor unit for a sunroof, to contact the worm wheel 400 with the bush 300, a center portion of the bottom cover 800 on which the drive shaft 500 is located is required to be configured to be prevented from bending downward. To this end, in the conventional motor unit, the bottom cover 800 is formed of metal, and the drive shaft 500 and the lower surface of the worm wheel 400 are required to be configured to be raised by screw fastening or a stacking structure (see FIG. 1 of patent document 2). Accordingly, the conventional motor unit has difficulty in assembling, and requires continuous maintenance for preventing the downward bending.

However, in the embodiment of the present disclosure, the pinion gear 600 and the drive shaft 500 may be coupled to each other by riveting, so there may be no vertical interval in each contact surface between the worm wheel 400, the bush 300, the washer 700, and the pinion gear 600. Accordingly, the downward bending of the bottom cover 800 may not be required to be considered.

That is, according to the embodiment of the present disclosure, due to the coupling structure of the pinion gear 600 to the drive shaft 500 by the riveting, the bottom cover 800 may be configured as a structure assembled only by hooking, so the assembling of the bottom cover 800 may be easily performed. Furthermore, the bottom cover 800 may be made of resin instead of metal, so the weight and manufacturing cost of the motor unit for a sunroof may be reduced.

Meanwhile, a receiving part 820 may be formed at the center portion of the bottom cover 800 such that the hub part 420 of the worm wheel 400 is received to the receiving part 820. Such a receiving part 820 may function to guide the precise rotation of the hub part 420.

In this case, the hub part 420 may be configured not to be in contact with the receiving part 820. Of course, although the hub part 420 is in contact with the receiving part 820, the hub part 420 and the receiving part 820 may be made of the same (or similar) resin materials, so contact noise therebetween may not be generated to disturb a user.

In addition, a through hole 830 may be formed in the receiving part 820 such that the drive shaft 500 passes through the through hole. In this case, the inner diameter of the through hole 830 may be configured to be larger than the outer diameter of the drive shaft 500.

That is, due to the through hole 830, the drive shaft 500 may not be in contact with the bottom cover 800. Accordingly, despite the operation of the drive shaft 500, contact noise between the drive shaft 500 and the bottom cover 800 may not be generated.

Hereinbelow, the assembly process and operation process of the motor unit for a sunroof according to the embodiment of the present disclosure described above will be described further in detail.

Figure 9:
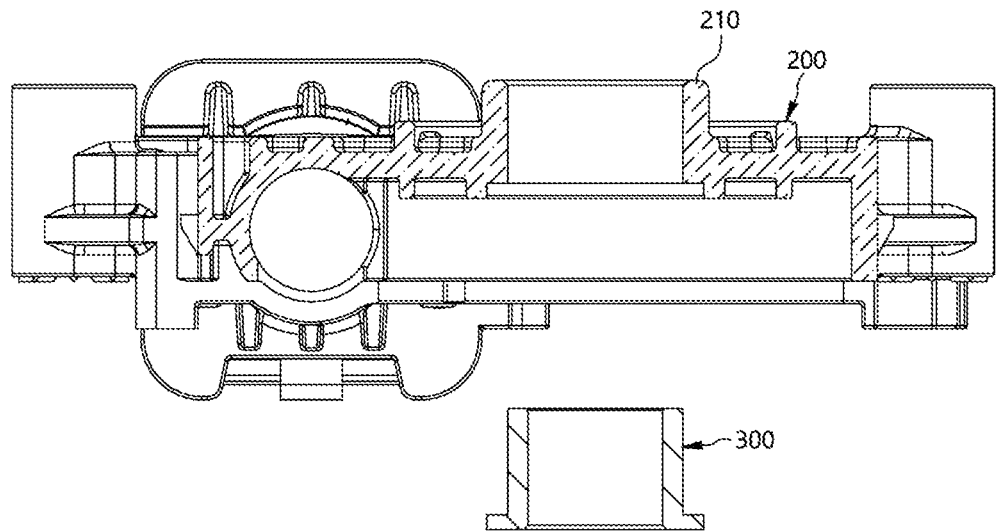
FIGS. 9 to 13 are state views illustrating the assembly process of the motor unit for a sunroof in an assembly order according to the embodiment of the present disclosure.

First, as illustrated in FIG. 9, the bush 300 may be press-fitted into and fixed to the protruding hub 210 of the upper housing 200 made individually.

The upper housing 200 may be manufactured by injection molding, and the bush 300 may be press-fitted to the protruding hub 210 by being inserted thereto from the lower side of the protruding hub 210. In this case, the lower end of the bush 300 may be configured to bend outward, so the bush 300 may be prevented from excessively protruding from the protruding hub 210.

Figure 10:
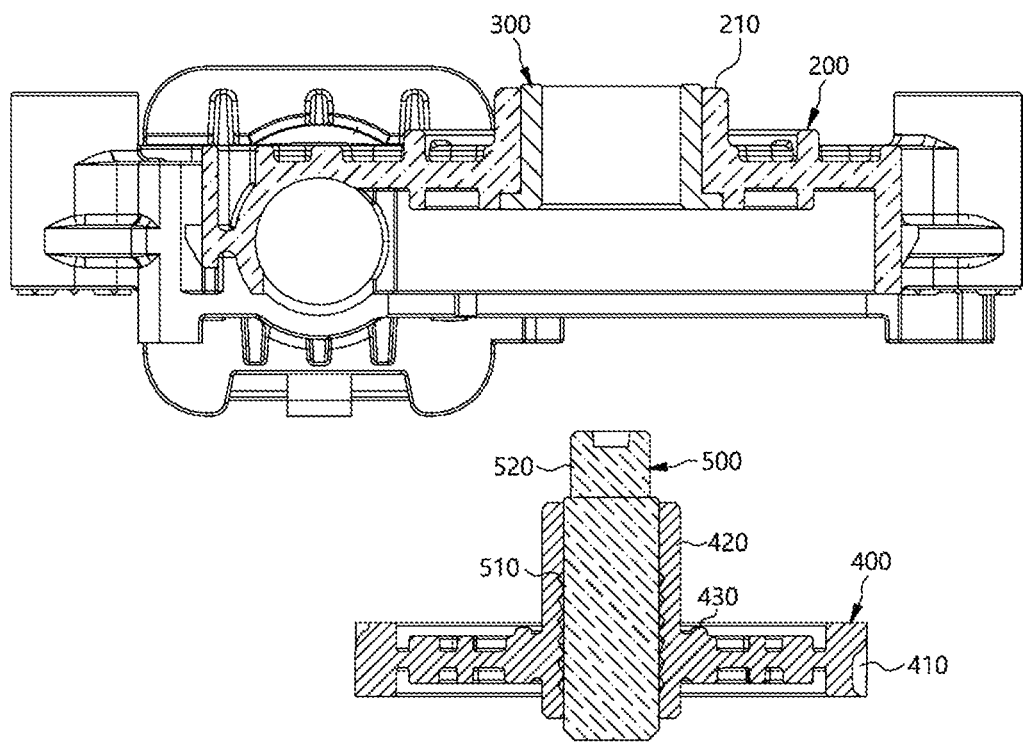

Next, as described above, when the assembly of the bush 300 is completed, the assembly of the worm wheel may be coupled to the bush 300 as illustrated in FIG. 10.

The assembly of the worm wheel may be an assembly composed of the worm wheel 400 and the drive shaft 500. In such an assembly of the worm wheel, the worm wheel 400 and the drive shaft 500 may be configured to be integrated with each other through the insert injection.

In addition, when coupling the assembly of the worm wheel to the bush 300, the hub part 420 of the worm wheel 400 constituting the assembly of the worm wheel may be inserted into the bush 300 from a lower side thereof to pass through the inside of the bush 300.

In this case, until the contact part 430 of the worm wheel 400 is in contact with the lower surface of the bush 300, the hub part 420 may be inserted into the bush 300.

Figure 11:
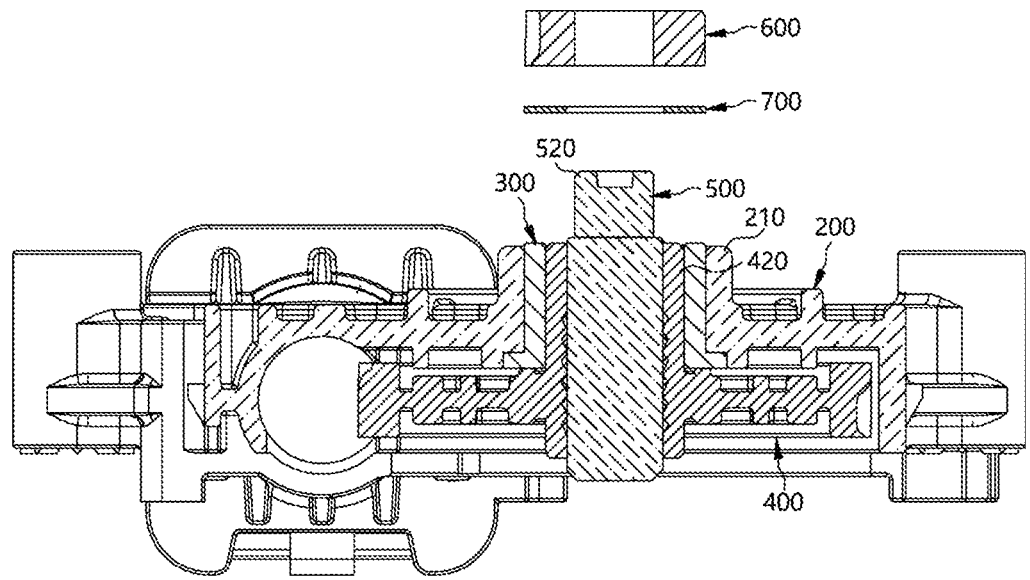

Accordingly, the serration part 520 which is a part of the upper end side of the drive shaft 500 may pass through the bush 300 and be exposed to the upper side thereof, and the upper surface of the hub part 420 may be located to reach approximately the same height as the height of the bush 300. This is as illustrated in FIG. 11.

Figure 12:
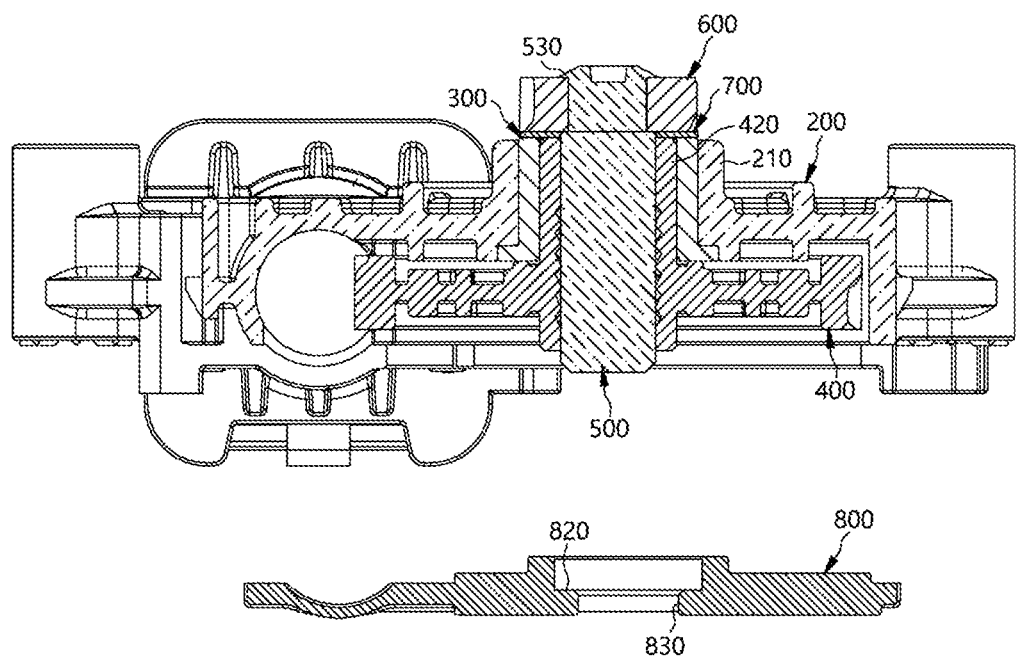
Figure 13:
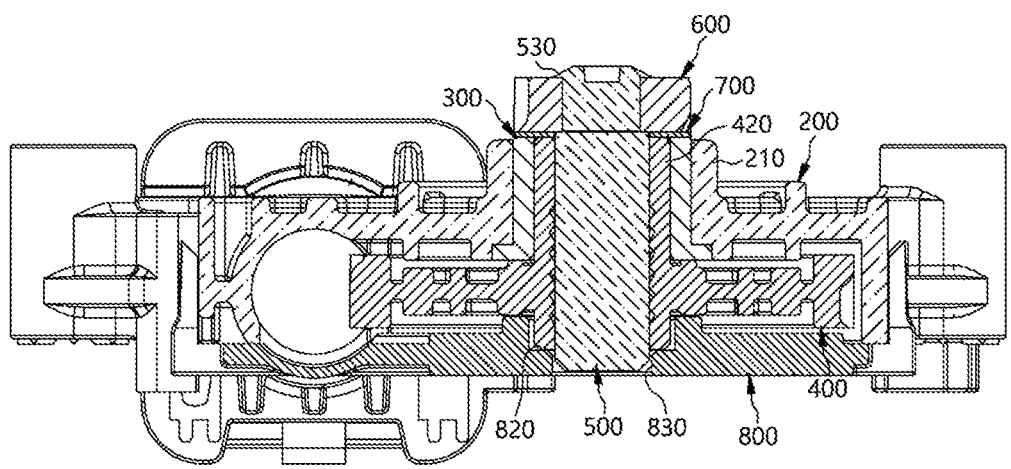

Next, when the assembly of the worm wheel is completed, the pinion gear 600 may be coupled thereto as illustrated in FIG. 12.

In this case, during the coupling of the pinion gear 600, the washer 700 may first be installed at the circumference of the drive shaft 500 exposed to the upper side of the bush 300, and then the pinion gear 600 may be coupled to the serration part 520 of the drive shaft 500.

Accordingly, the washer 700 may be located between the upper surface of the hub part 420 and the lower surface of the pinion gear 600.

Next, the bent part 530 may be formed at the upper end of the drive shaft 500 as illustrated in FIG. 12.

That is, while the drive shaft 500 is pulled maximally upward, a portion of the upper surface of the drive shaft 500 may be transformed through the riveting to form the bent part 530.

Accordingly, the upper surface of the contact part 430 of the worm wheel 400 may be in contact with the lower surface of the bush 300 by the riveting described above. Additionally, the lower surface of the washer 700 on which the pinion gear 600 is placed may be located to be in contact with the upper surface of the bush 300. Accordingly, the drive shaft 500, the worm wheel 400 fixed thereto, the pinion gear 600, and the bush 300 have no vertical interval therebetween, but may rotate.

That is, the drive shaft 500, the worm wheel 400, the bush 300, the pinion gear 600, and the washer 700 may be configured to be integrated with each other. Accordingly, no vertical interval between the pinion gear 600 and the washer 700, no vertical interval between the washer 700 and the bush 300, and no vertical interval between the bush 300 and the worm wheel 400 may exist.

In addition, when the drive shaft 500 is coupled to the pinion gear 600 by the riveting as described above, as illustrated in FIGS. 12 and 13, the bottom cover 800 provided separately may be coupled to the upper housing 200.

The bottom cover 800 may be provided by being mounted to the upper side of the printed circuit board 110 located inside the lower housing 100.

The drive motor 130 may be provided by being mounted to the lower housing 100. In this case, the worm gear 140 may be provided by being installed on the motor shaft 131 of the drive motor 130, which is illustrated in FIG. 6.

Accordingly, when the bottom cover 800, the upper housing 200, and the lower housing 100 are simultaneously coupled to each other, the worm wheel 400 may be coupled to the worm gear 140 such that power is transmitted therebetween with the circumference of the worm wheel 400 engaged with the worm gear 140, and the bottom of the worm wheel 400 may be located to be blocked by the bottom cover 800. Accordingly, the assembly of the motor unit for a sunroof may be completed.

Next, the operation state of the motor unit for a sunroof assembled as described above according to the embodiment of the present disclosure will be described further in detail.

In the motor unit for a sunroof according to the embodiment of the present disclosure, the sunroof glass (not shown) may be operated to be opened or closed according to the operation direction of the drive motor 130.

That is, while the pinion gear 600 operates clockwise or counterclockwise according to the clockwise/counterclockwise operation of the drive motor 130, the sunroof glass may be operated to be opened or closed.

Particularly, due to the clockwise/counterclockwise rotation of the drive motor 130, direction of force applied to the wire for operating the sunroof glass (not shown) connected to the pinion gear 600 may be changed, so the pinion gear 600 may move upward or downward.

That is, when the drive motor 130 is driven clockwise to open the sunroof glass, force of moving the pinion gear 600 upward may be supplied to the pinion gear 600 such that the pinion gear 600 moves upward. Furthermore, when the drive motor 130 is driven counterclockwise to close the sunroof glass, force of moving the pinion gear 600 downward may be supplied to the pinion gear 600 such that the pinion gear 600 moves downward.

However, the pinion gear 600 may be riveted to the drive shaft 500, and the drive shaft 500 may be configured to be integrated with the worm wheel 400. In addition, the upper surface of the contact part 430 of the worm wheel 400 may be maintained to be in contact with the lower surface of the bush 300, and the upper surface of the hub part 420 of the worm wheel 400 may be maintained to be in contact with the lower surface of the washer 700. Accordingly, the drive shaft 500, the worm wheel 400 fixed thereto, and the pinion gear 600 may have no vertical interval therebetween.

That is, although the upward or downward movement of the pinion gear 600 as described above occurs, the pinion gear 600 may be prevented from shaking vertically.

Accordingly, irrespective of the clockwise/counterclockwise rotation of the pinion gear 600, contact between the bush 300 and the worm wheel 400 and contact between the washer 700 and the bush 300 may be continuously performed in the same manners, so contact noise therebetween may be prevented from being changed according to the state of the rotation of the pinion gear 600.

Finally, in the motor unit for a sunroof according to the present disclosure, the same noise may be generated irrespective to the clockwise/counterclockwise rotation of the pinion gear 600, thereby preventing complaints of a user caused by contact noises different from each other occurring during the opening and closing of the sunroof glass.

Furthermore, in the motor unit for a sunroof according to the present disclosure, the pinion gear 600 may be maintained to be in continuous contact with the washer 700, thereby enabling the drive shaft 500 to continuously and efficiently operate without being shaken horizontally by force applied to the pinion gear. In addition, in the motor unit for a sunroof according to the present disclosure, each component may be configured to have no interval therebetween while the drive shaft 500 is pulled to the upper surface of the pinion gear 600 by the riveting, so the downward bending of the bottom cover 800 may not occur. That is, a design for preventing the downward bending of the bottom cover 800 may not be required. Particularly, the bottom cover 800 may be made of a resin material, so the manufacturing and assembly of the motor unit for a sunroof may be easily performed.

Meanwhile, the motor unit for a sunroof according to the present disclosure may not be limited to the embodiment described above.

For example, the upper surface of the hub part 420 constituting the worm wheel 400 may be configured to protrude more than the upper surface of the bush 300.

In this case, the lower surface of the washer 700 may be in contact with only the upper surface of the hub part 420. Accordingly, although the washer 700 is formed of metal, the washer 700 may be in contact with the hub part 420 made of resin, which may further reduce entire noise.

Of course, despite the above mentioned configuration, interval may not exist between the pinion gear 600 and the washer 700 and the bush 300 (or the hub part), so the uneven wear or malfunction of the motor unit for a sunroof which may be caused by the interval may be prevented.

Accordingly, the motor unit for a sunroof according to the present disclosure may be transformed into various forms.

What is claimed is:
1. A motor unit for a sunroof, the motor unit comprising:
a lower housing configured as a box body having an open upper surface and having a drive motor provided therein, the drive motor driving a motor shaft having a worm gear provided thereon;
an upper housing configured as a box body having an open lower surface so as to cover the open upper surface of the lower housing, the upper housing having a protruding hub formed at a center portion thereof;

a bush provided in the protruding hub of the upper housing;

a worm wheel having a circumference configured to be rotated in engagement with the worm gear and having a hub part formed at a center of the worm wheel by protruding therefrom, the hub part being rotatably installed by passing through an inside of the bush;

a drive shaft installed to be fixed to the worm wheel by passing through the hub part of the worm wheel;

a pinion gear coupled to an upper end part of the drive shaft such that power is transmitted therebetween;

a washer located between the pinion gear and the hub part of the worm wheel; and a bottom cover allowing the worm wheel to be rotatably mounted thereto, wherein a bent part is formed at an upper end of the drive shaft, the bent part covering a portion of an upper surface of the pinion gear, and a contact part is formed at an upper surface of the worm wheel, the contact part configured to be in contact with a lower surface of the bush.

2. The motor unit of claim 1, wherein the bent part of the drive shaft is formed through riveting after the pinion gear is coupled to the drive shaft.

3. The motor unit of claim 1, wherein the bush and the washer are made of metals, and the worm wheel is made of resin.

4. The motor unit of claim 1, wherein the washer is configured to be in contact with an upper surface of the hub part of the worm wheel.

5. The motor unit of claim 1, wherein a receiving part is formed in the bottom cover such that the hub part of the worm wheel is received in the receiving part, and a through hole is formed in the receiving part such that the drive shaft passes through the through hole.

6. The motor unit of claim 1, wherein when the drive shaft fixed to the worm wheel moves upward, the contact part is located to be in contact with the bush.

7. The motor unit of claim 1, wherein when the drive shaft fixed to the worm wheel moves maximally upward, the contact part is located to be in contact with the bush.

8. The motor unit of claim 1, wherein the bush has a lower end formed to bend toward the upper housing such that the bush is restricted from moving upward from the upper housing.

9. The motor unit of claim 1, wherein the washer is configured to cover an upper surface of the hub part of the worm wheel and an upper surface of the bush.

* * * * *